United States Patent [19]
Morris

[11] 3,831,431
[45] Aug. 27, 1974

[54] ADJUSTABLE STATIC PRESSURE OR VACUUM SOURCE AND INDICATOR

[76] Inventor: Billy D. Morris, Rd. 1, Red Lion, Pa. 17356

[22] Filed: May 11, 1973

[21] Appl. No.: 359,240

[52] U.S. Cl. .............................. 73/4 R
[51] Int. Cl. ............................. G01l 27/00
[58] Field of Search ................ 73/4 R, 405

[56] References Cited
UNITED STATES PATENTS
2,370,095   2/1945   Vetter .......................... 73/405

FOREIGN PATENTS OR APPLICATIONS
749,525   11/1944   Germany ........................ 73/4 R Primary Examiner—S. Clement Swisher
Attorney, Agent, or Firm—Paul & Paul

[57] ABSTRACT

Device and method for checking and calibrating vacuum and low pressure pneumatic gauges and differential pressure switches by utilizing a helix of tubing partially filled with a liquid and then rotated about its axis to a new position as a readily adjustable, highly accurate, constant source of vacuum or low pressure.

9 Claims, 5 Drawing Figures

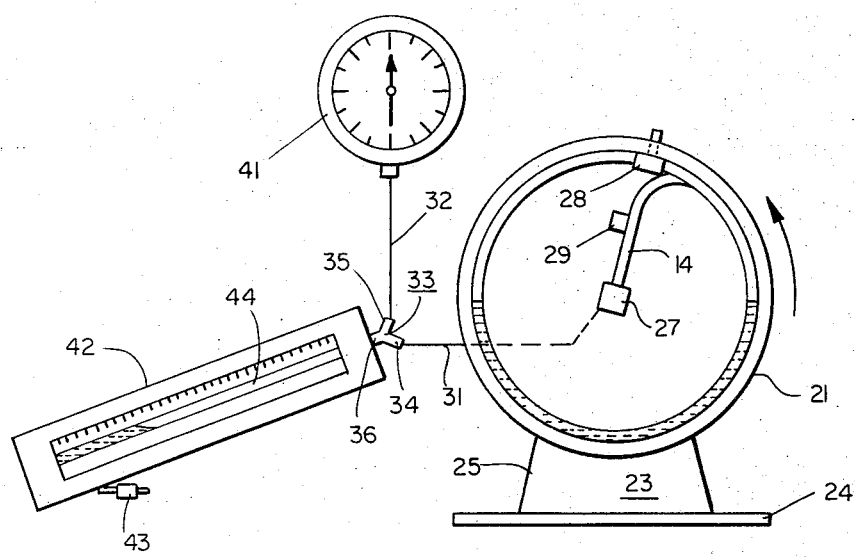
Fig. 1
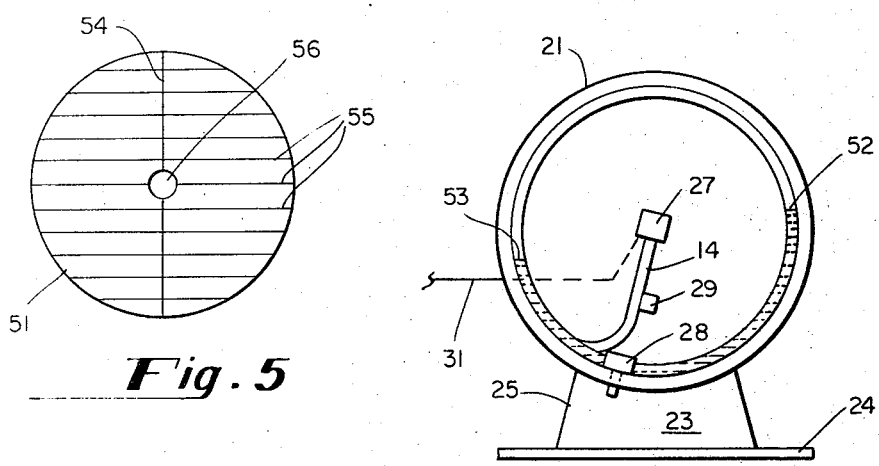
Fig. 5
Fig. 2
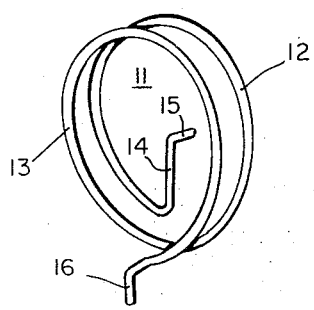
Fig. 4
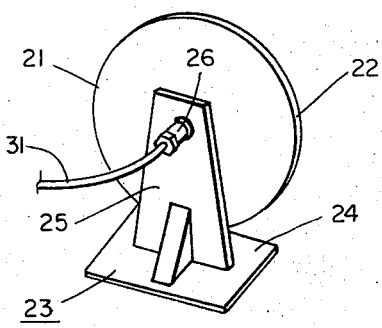
Fig. 3

ADJUSTABLE STATIC PRESSURE OR VACUUM SOURCE AND INDICATOR

BACKGROUND OF THE INVENTION

This invention relates to a calibration of low pressure or vacuum gauges, particularly those low pressure or vacuum pneumatic gauges typically encountered in process control instrumentation.

In checking and calibrating low pressure or vacuum pneumatic gauges and in testing and adjusting differential pressure switches for pneumatic controls or the like, in the range up to 6 inches of water, it is necessary to use a source of low pneumatic pressure or suction, conventionally a manually operated aspirator bulb. This source is erratic and difficult to keep in adjustment, impairing the accuracy of the results. More constant and readily adjustable sources, however, have been heretofore too expensive and too complicated to be feasible for use in the shop.

Typical of the pressure-calibration device heretofore available are U.S. Pat. Nos. 3,107,515; 3,148,528; 3,232,092; 3,239,827; and 3,633,402.

SUMMARY OF THE INVENTION

The present invention overcomes the limitations of the prior art by providing a device and method for calibrating low pressure or vacuum fluid indicators by providing a pressure or vacuum source which, though of a design simple enough to be used in the shop, is yet constant and readily adjustable.

Hereinafter, vacuum will be regarded as a negative pressure and the term "pressure" should be understood to include the term "vacuum". The constant, readily-adjustable static pressure source of the present invention is obtained in the following manner: a helical coil of tubing is mounted vertically in such a manner as to allow it rotational freedom about the axis of the helix, as for example, on a bearing allowing moderate frictional rotation. A liquid suitable for the pressure range desired is then poured into the tubing, enough to fill approximately half a turn. A "turn" as used herein means one 360° section of the helix. One end of the helix is left open to ambient atmosphere, and the other end is joined to a tee connection. A "tee" connection means the type having one inlet and two common outlets, in the general shape of the capital letter T. The outlets of the tee connection are connected to a calibrated pressure indicator, generally a manometer, and an uncalibrated pressure indicator which is to be calibrated, usually a pneumatic vacuum gauge. The helix is then rotated a half turn or more, thereby producing an identical pressure (or a vacuum, if rotated in the opposite direction) on both the calibrated pressure indicator and the uncalibrated pressure indicator. The uncalibrated pressure indicator is then adjusted to read the same as the calibrated pressure indicator.

Accordingly, it is an object of this invention to provide a static pressure-source device which, while simple in design, is yet constant and readily adjustable.

It is also an object of this invention to provide a fluid pressure-indicator calibrating device of a simple design yet with a source which is both constant and readily adjustable.

It is also an object of this invention to provide a method of calibrating fluid pressure indicators which, while of a simple nature, is non-erratic and readily adjustable.

BRIEF DESCRIPTION OF THE DRAWINGS

FIG. 1 is a schematic illustration of the device of this invention, showing the static pressure-source device, a manometer, a tee connection, and an uncalibrated vacuum gauge;

FIG. 2 is a schematic illustration of the device of the present invention after the static pressure-source device has been rotated counter-clockwise a half turn on the rotational mounting means thereby a small vacuum, as evidenced by the difference in levels of the fluid in the tubing;

FIG. 3 is a schematic illustration of a back view of the device of the present invention, showing the bearing which permits moderate frictional rotation;

FIG. 4 is a schematic illustration showing a two-turn helix of tubing of the present invention;

FIG. 5 shows an alternative differential level indicating scale which can be placed on the back inside surface of the shallow cylindrical shell of the rotational mounting means.

DESCRIPTION OF THE PREFERRED EMBODIMENT

Referring now to the drawings in detail, FIG. 4 shows the helix of tubing 11 which is the principal component of the static pressure-source device of the present invention; this embodiment having two turns 12 and 13. At one end of helix 11 the tubing is extended radially inward 14 to the axis and then axially to form an external connection 15. The other end of helix 11 is directed radially outward to form a circumferential external connection or vent 16. Although generally any type of tubing may be used, this particular embodiment was formed from transparent one-half inch "Tygon" vinyl compound plastic tubing into a 10-inch diameter helix. Helix of tubing 11 is housed circumferentially within shallow cylindrical shell 21, having a narrow edge 22, shell 21 being mounted for manual moderate frictional rotation on pedestal 23, having a base plate 24 and a vertical member 25. Helix 11 and cylindrical shell 21 are mounted for manual moderate frictional rotation by means of rearwardly extending bearing 26 affixed to vertical member 25 as shown in FIG. 3. External connections 15 and 16 of helix 11 are attached on rotational mounting means 21 to fixtures 27 and 28, respectively. Radial extension 14 is held in place on rotational mounting means 21 by support means 29. Fixture 28 extends through edge 22, while fixture 27 extends rearwardly through the back of rotational mounting means 21 and vertical member 25 and bearing 26 to communicate with connecting line 31.

Connecting line 31 leads to inlet 34 of tee connection 33. Outlet 35 of tee connection 33 leads, by means of connecting line 32, to uncalibrated vacuum gauge 41. Outlet 36 of tee connection 33 communicates with manometer 42. Generally, in place of manometer 42 may be any calibrated pressure indicator, and in place of vacuum gauge 41 may be any uncalibrated pressure indicator.

In operation, assuming helix 11 to be initially empty, line 31 is first disconnected from fixture 27. Fixture 28 is then rotated to a top position, similar to that shown in FIG. 1. A liquid suitable for the pressure range desired is then introduced into helix 11 through fixture 28 to fill approximately a half turn of helix 11. The liquid initially placed into helix 11 will be in turn 13, which is the normal position for producing a positive pressure; if a vacuum is to be produced, after introduction of the liquid into turn 13, helix 11 is rotated clockwise to place the half turn of liquid in turn 12, as is the case here. Line 31 is then reconnected to fixture 27. Helix 11 is then rotated counter-clockwise, as shown by the arrow in FIG. 1, to the position shown in FIG. 2 thereby resulting in a negative pressure or vacuum along line 31 to tee connection 33, thus producing an identical negative pressure on both manometer 42 and vacuum gauge 41. Gauge 41 is then adjusted to read the same as calibrated manometer 42.

If it is desired to provide positive pressure, tee connection 33 is connected to bottom manometer connection 43, leaving the top of manometer tube 44 open to ambient atmosphere. In that situation helix 11 is rotated clockwise, rather than counter-clockwise.

An alternative embodiment is shown in FIG. 5; a differential level indicating scale disc capable of being freely rotatably mounted about fixture 27 on the back inside surface of the shallow cylindrical shell of the rotatable mounting means 21. This differential level indicating scale rotates freely about fixture 27 so that the vertical distance between opposing levels 52 and 53 of the liquid within helix 11 due to the produced positive pressure or vacuum can be read directly on the back inside surface of rotational mounting means 21. In such a case, tee connection 33 and manometer 44 would be eliminated, and line 31 connected directly to gauge 41 or whichever pressure indicator is to be checked. Line 54 of differential level indicating scale disc 51 is placed in a vertical position by rotating the disc on centerhole 56 about fixture 27. The difference between levels 52 and 53 is then read directly from disc 51 by counting the number of lines 55 of disc 51 which lie between levels 52 and 53 and then multiplying by their spacing.

Although a specific form of the invention has been selected for illustration in the drawings and the above description is drawn at specific times for the purpose of describing this form of the invention, this description is not intended to limit the scope of the invention which is defined in the appended claims.

It will be understood that various changes in the details, materials and arrangement of parts which have been described and illustrated above in order to explain the nature of this invention, may be made by those skilled in the art within the principle and scope of the invention as described in the appended claims.

It will further be understood that the abstract of the disclosure set forth above is intended to provide a nonlegal technical statement of the contents of the disclosure in compliance with the rules of practice of the United States Patent Office and is not intended to limit the scope of the invention as claimed.

I claim:

1. Static pressure-source device for providing a constant source of static positive or negative pressure in a given position thereof when connected to external devices, comprising:
   a helix of tubing having more than one turn, partially filled with a liquid; portion
   rotational mounting means for rotatably mounting said helix of tubing with its axis substantially horizontal, whereby rotation of said helix of tubing about its axis from an original position to the given position moves said liquid to a corresponding position within said helix of tubing, thereby tending, when connected to an external device such that the tubing is closed to atmosphere between the liquid therein and the external device, to produce a negative pressure within that non-liquid-filled portion of said helix of tubing which adjoins the original position of said liquid, and a positive pressure within that non-liquid-filled prtion of said helix of tubing which adjoins the new position of said liquid corresponding to said given position of said helix of tubing;
   connection means adapted for the introduction of a liquid, at a first end of said helix of tubing; and
   external connection means adapted for connection to external devices, at the other end of said helix of tubing.

2. Device according to claim 1 wherein said helix of tubing is transparent.

3. Device according to claim 1 wherein the number of turns of said helix of tubing is two.

4. Device according to claim 1 comprising in addition a differential level indicator scale rotatably affixed to said mounting means.

5. Fluid pressure-indicator calibrating device for calibrating uncalibrated fluid pressure indicators, comprising:
   a helix of tubing having more than one turn, said helix of tubing being partially filled with a liquid;
   rotational mounting means for rotatably mounting said helix of tubing with its axis substantially horizontal, whereby rotation of said helix of tubing about its axis to a new position moves said liquid to a corresponding new position within said helix of tubing, thereby tending to produce a negative pressure within that non-liquid-filled portion of said helix of tubing which adjoins the old position of said liquid, and a positive pressure within that non-liquid-filled portion of said helix of tubing which adjoins the new position of said liquid;
   a calibrated fluid pressure indicator;
   connection means adapted for the introduction of a liquid, at a first end of said helix of tubing;
   connecting tubing to said calibrated fluid pressure indicator, from the other end of said helix of tubing; and
   connecting tubing to an uncalibrated fluid pressure indicator, which is to be calibrated, from said other end of said helix of tubing.

6. Device according to claim 5 wherein said calibrated pressure indicator is a manometer.

7. Device according to claim 6 wherein:
   said helix of tubing is transparent;
   the number of turns of said helix of tubing is two;
   said rotational mounting means is a shallow cylindrical shell; and further comprising:
   a pedestal supporting said shallow cylindrical shell;
   a bearing on said shallow cylindrical shell adapted to allow moderate manual frictional rotation of said shell; and
   a differential level indicator scale rotatably affixed to said shallow cylindrical shell.

8. Method of calibrating fluid pressure indicators comprising the steps of:
   connecting to both a calibrated pressure indicator and to an uncalibrated pressure indicator the same end of a helix of tubing, rotatably mounted with its axis substantially horizontal, having more than one turn, partially filled with a liquid, the other end of the helix being vented to ambient atmosphere, whereby rotation of said helix of tubing about its axis to a new position moves said liquid to a new position within said helix of tubing, thereby tending to produce a negative pressure within that non-liquid-filled portion of said helix of tubing which adjoins the old position of said liquid, and a positive pressure within that non-liquid-filled portion of said helix of tubing which adjoins the new position of said liquid;

rotating said helix of tubing about its axis to a new position thereby producing an identical pressure on both the calibrated and uncalibrated pressure indicators; and then adjusting the uncalibrated pressure indicator to read the same as the calibrated pressure indicator.

9. Method of providing a contant source of static positive or negative pressure to external devices, comprising the steps of:

filling partially with a liquid from a first end a helix of tubing having more than one turn;

mounting with its axis substantially horizontal said helix of tubing so as to permit rotation about its axis, whereby rotation of said helix of tubing about its axis to a new position moves said liquid to a new position within said helix of tubing, thereby tending to produce a negative pressure within that non-liquid-filled portion of said helix of tubing which adjoins the old position of said liquid, and a positive pressure within that non-liquid-filled portion of said helix of tubing which adjoins the new position of said liquid when connected to an external device such that the tubing is closed to atmosphere between the liquid therein and the external device;

connecting the other end of said helix of tubing to an external device; and then rotating said helix of tubing about its axis to a new fixed position and maintaining such new position thereby communicating a constant source of static pressure to said external device.

* * * * *

UNITED STATES PATENT OFFICE
CERTIFICATE OF CORRECTION

Patent No. 3,831,431　　　　Dated August 27, 1974

Inventor(s) Billy D. Morris

It is certified that error appears in the above-identified patent and that said Letters Patent are hereby corrected as shown below:

Col. 2, line 12, after the word "thereby", insert therefor
--producing-- ;

Col. 3, line 63, after the word "liquid;", delete --portion-- .

Signed and sealed this 19th day of November 1974.

(SEAL)
Attest:

McCOY M. GIBSON JR.　　　　　　　C. MARSHALL DANN
Attesting Officer　　　　　　　　Commissioner of Patents